US012755402B2

(12) United States Patent
Kim et al.

(10) Patent No.: US 12,755,402 B2
(45) Date of Patent: Oct. 6, 2026

(54) SOFTWARE-BASED OBJECT TRACKING METHOD AND COMPUTING DEVICE THEREFOR

(71) Applicant: 3I INC., Daegu (KR)

(72) Inventors: Ken Kim, Seoul (KR); Ji Wuck Jung, Goyang-si (KR)

(73) Assignee: 31 INC., Daegu (KR)

( * ) Notice: Subject to any disclaimer, the term of this patent is extended or adjusted under 35 U.S.C. 154(b) by 390 days.

(21) Appl. No.: 18/340,311

(22) Filed: Jun. 23, 2023

(65) Prior Publication Data

US 2024/0005529 A1 Jan. 4, 2024

Related U.S. Application Data

(63) Continuation of application No. PCT/KR2022/018565, filed on Nov. 23, 2022, and a (Continued)

(30) Foreign Application Priority Data

Jun. 29, 2022 (KR) ........................ 10-2022-0080041
Sep. 30, 2022 (KR) ........................ 10-2022-0125389

(Continued)

(51) Int. Cl.
*G06T 7/246* (2017.01)
*G06V 10/70* (2022.01)

(Continued)

(52) U.S. Cl.
CPC .............. *G06T 7/248* (2017.01); *G06V 10/70* (2022.01); *H04N 23/61* (2023.01);

(Continued)

(58) Field of Classification Search
None
See application file for complete search history.

(56) References Cited

U.S. PATENT DOCUMENTS

| | | | |
|---|---|---|---|
| 11,335,012 | B2 | 5/2022 | Kim et al. |
| 11,423,666 | B2 | 8/2022 | Li et al. |

(Continued)

FOREIGN PATENT DOCUMENTS

| | | | |
|---|---|---|---|
| CN | 109726683 | A | 5/2019 |
| CN | 109726683 | B | 6/2021 |

(Continued)

OTHER PUBLICATIONS

JP2016127571 English machine translation (Year: 2015).*

*Primary Examiner* — Nancy Bitar
(74) *Attorney, Agent, or Firm* — NSIP Law

(57) ABSTRACT

A software-based object tracking method according to a technical aspect of the present invention is a method of providing object tracking performed in a computing device including a camera module. The software-based object tracking method includes receiving a selected frame image captured at a first resolution from the camera module, setting a second resolution for a viewing window, identifying whether a tracking object exists in the selected frame image, and setting a partial area of the selected frame image including the tracking object as the viewing window on the basis of a location of the tracking object within the selected frame image. The second resolution of the viewing window may be a resolution lower than the first resolution of the selected frame image.

19 Claims, 20 Drawing Sheets

Related U.S. Application Data continuation of application No. PCT/KR2022/019010, filed on Nov. 29, 2022.

(30) Foreign Application Priority Data

Nov. 15, 2022 (KR) ........................ 10-2022-0152262
Nov. 29, 2022 (KR) ........................ 10-2022-0162112

(51) Int. Cl.
*H04N 23/61* (2023.01)
*H04N 23/611* (2023.01)
*H04N 23/63* (2023.01)

(52) U.S. Cl.
CPC ......... *H04N 23/611* (2023.01); *H04N 23/632* (2023.01); *H04N 23/633* (2023.01); *G06T 2200/24* (2013.01); *G06T 2207/10016* (2013.01); *G06T 2207/20081* (2013.01); *G06T 2207/30244* (2013.01)

(56) References Cited

U.S. PATENT DOCUMENTS 11,450,131 B2 9/2022 Matsuo
12,374,044 B2 * 7/2025 Sagàs ...................... G06T 17/20
12,452,540 B1 * 10/2025 Lee ........................ H04N 23/73
2018/0097944 A1 * 4/2018 Otake ................... G06F 3/1203
2021/0073558 A1 * 3/2021 Li .......................... G06N 3/045
2021/0248361 A1 8/2021 Matsuo
2022/0122273 A1 4/2022 Kim et al.
2022/0138493 A1 5/2022 Lee et al.
2023/0419505 A1 * 12/2023 Tang ...................... H04N 23/73

FOREIGN PATENT DOCUMENTS

JP 2016-127571 * 1/2015
JP 2016-127571 A 7/2016
JP 2021-124669 A 8/2021
JP 2021-524093 A 9/2021
JP 7153090 B2 10/2022
KR 10-2018-0097944 A 9/2018
KR 10-2021-0024124 A 3/2021
KR 10-2295183 B1 8/2021
KR 10-2022-0052620 A 4/2022
KR 10-2022-0059194 A 5/2022
SG 11202012755 T 1/2021
WO WO 2020/134557 A1 7/2020

* cited by examiner

SOFTWARE-BASED OBJECT TRACKING METHOD AND COMPUTING DEVICE THEREFOR

CROSS-REFERENCE TO RELATED APPLICATIONS

Pursuant to 35 USC 120 and 365(c), this application is a continuation of International Application No. PCT/KR2022/018565 filed on Nov. 23, 2022 and PCT Application No. PCT/KR2022/019010 filed on Nov. 29, 2022, in the Korean Intellectual Property Office, and claims the benefit under 35 USC 119(a) of Korean Patent Application No. 10-2022-0080041 filed on Jun. 29, 2022, Korean Application No. 10-2022-0125389 filed on Sep. 30, 2022, Korean Patent Application No. 10-2022-0152262 filed on Nov. 15, 2022, and Korean Patent Application No. 10-2022-0162112 filed on Nov. 29, 2022, in the Korean Intellectual Property Office, the disclosures of which are incorporated herein by reference.

BACKGROUND

1. Field

The present invention relates to a software-based object tracking method and a computing device therefor.

2. Description of the Related Art

With the development of computing devices, miniaturization and portability of computing devices are being promoted, and a user-friendly computing environment is being developed.

As a user's main interest in such a computing environment, there is a tracking function for an object of interest in an image being captured.

In the conventional case, for object tracking, it is necessary to use several pieces of capturing equipment or to physically drive the capturing equipment.

However, it is difficult to apply in a miniaturized and portable computing device environment, and there are limitations in requiring separate equipment.

SUMMARY

This Summary is provided to introduce a selection of concepts in a simplified form that is further described below in the Detailed Description. This Summary is not intended to identify key features or essential features of the claimed subject matter, nor is it intended to be used as an aid in determining the scope of the claimed subject matter.

One technical aspect of the present application is to solve the problems of the related art, and according to an embodiment disclosed in the present application, an object of the present application is to effectively provide object tracking based on software for images captured in a certain fixed direction.

According to an embodiment disclosed in the present application, an object of the present application is to quickly and accurately perform identification and identity determination of an object by identifying a tracking object within a frame image using a first deep learning model trained with a large amount of training data to identify a tracking object and determining identity of the tracking object using a second deep learning model trained with a large amount of training data associated with the external features of the tracking object.

According to an embodiment disclosed in the present application, an object of the present application is to provide higher tracking performance by resetting a viewing window based on positional criticality of the viewing window in consecutive frame images to prevent an error in setting of the viewing window due to an error or misrecognition of other objects.

Aspects of the present application are not limited to the above-described aspects. That is, other aspects that are not described may be obviously understood by those skilled in the art from the following specification.

An aspect of the present application provides a software-based object tracking method. The software-based object tracking method is a method of providing object tracking performed in a computing device including a camera module. The software-based object tracking method may include receiving a selected frame image captured at a first resolution from the camera module, setting a second resolution for a viewing window, identifying whether a tracking object exists in the selected frame image, and setting a partial area of the selected frame image including the tracking object as the viewing window on the basis of a location of the tracking object within the selected frame image. The second resolution of the viewing window may be a resolution lower than the first resolution of the selected frame image.

Another aspect of the present application provides another example of a software-based object tracking method. Another example of the software-based object tracking method is a method of providing object tracking performed in a computing device including a camera module that is fixed in a preset forward direction and generates a captured frame image. The software-based object tracking method may include receiving a plurality of captured frame images time sequentially captured at a first resolution from the camera module, selecting at least one selected frame image by extracting at least some of the plurality of captured frame images, identifying whether a tracking object exists in the at least one selected frame image, and setting each of partial areas of the at least one selected frame image including the tracking object as the viewing window on the basis of a location of the tracking object within the at least one selected frame image.

Another aspect of the present application provides a computing device. The computing device includes a camera module, a memory configured to store one or more instructions; and at least one processor configured to execute the one or more instructions stored in the memory. The at least one processor executes the one or more instructions to receive a selected frame image captured at a first resolution from the camera module, set a second resolution for a viewing window, identify whether a tracking object exists in the selected frame image, and set a partial area of the selected frame image including the tracking object as the viewing window on the basis of a location of the tracking object within the selected frame image. The second resolution of the viewing window may be a resolution lower than the first resolution of the selected frame image.

The means for solving the above problems do not enumerate all the features of the present application. Various units for solving the problems of the present application may be understood in more detail with reference to specific embodiments of the following detailed description.

BRIEF DESCRIPTION OF THE DRAWINGS

These and/or other aspects of the disclosure will become apparent and more readily appreciated from the following description of the embodiments, taken in conjunction with the accompanying drawings of which.

Throughout the drawings and the detailed description, the same reference numerals may refer to the same, or like, elements. The drawings may not be to scale, and the relative size, proportions, and depiction of elements in the drawings may be exaggerated for clarity, illustration, and convenience.

DETAILED DESCRIPTION OF EXEMPLARY EMBODIMENTS

Figure 1:
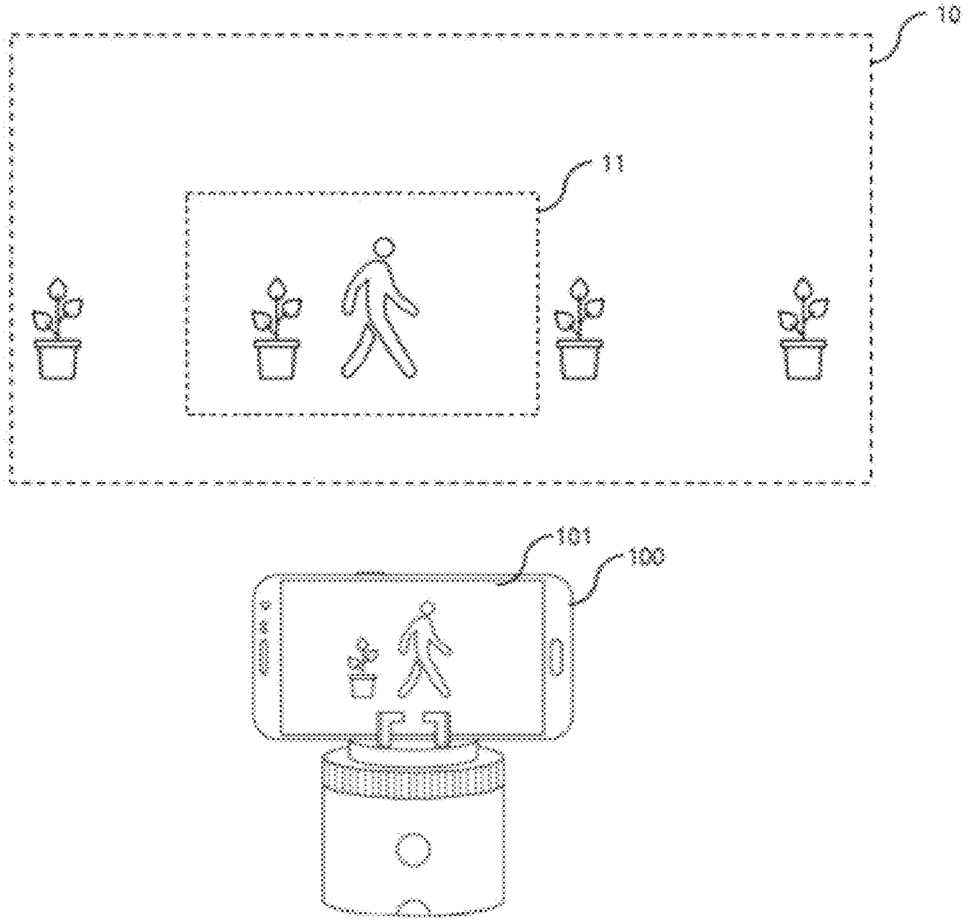
FIG. 1 is a diagram illustrating an example of a computing device in which software-based object tracking is performed according to an embodiment of the present application.

Hereinafter, exemplary embodiments of the present invention will be described with reference to the accompanying drawings.

However, embodiments of the present invention may be modified into many different forms and the scope of the present disclosure is not limited to the embodiments set forth herein. In addition, these embodiments of the present invention are provided so that the present disclosure will completely describe the present disclosure to those skilled in the art.

That is, the above-described objects, features, and advantages will be described below in detail with reference to the accompanying drawings, and accordingly, those skilled in the art to which the present invention pertains will be able to easily implement the technical idea of the present invention. Detailed description of the known art related to the present invention that may unnecessarily obscure the gist of the present invention will be omitted. Hereinafter, exemplary embodiments of the present disclosure will be described in detail with reference to the accompanying drawings. In the drawings, the same reference numerals are used to indicate the same or similar components.

In addition, singular forms used in the specification are intended to include plural forms unless the context clearly indicates otherwise. In the specification, it is to be noted that the terms "comprising," "including," and the like are not be construed as necessarily including several components or several steps described in the specification and some of the above components or steps may not be included or additional components or steps are construed as being further included.

In addition, in order to describe a system according to the present invention, various components and sub-components thereof will be described below. These components and their sub-components may be implemented in various forms, such as hardware, software, or a combination thereof. For example, each element may be implemented as an electronic configuration for performing a corresponding function, or may be implemented as software itself that can be run in an electronic system or as one functional element of such software. Alternatively, it may be implemented as an electronic configuration and driving software corresponding thereto.

Various techniques described in the present specification may be implemented with hardware or software, or a combination of both if appropriate. As used in the present specification, the terms "unit," "server," "system," and the like refer to a computer-related entity, that is, hardware, a combination of hardware and software, as equivalent to software or software in execution. In addition, each function executed in the system of the present invention may be configured in module units and recorded in one physical memory or distributed between two or more memories and recording media.

Various embodiments of the present disclosure may be implemented as software (for example, a program) including one or more instructions stored in a storage medium readable by a machine (for example, a user terminal 100 or computing device). For example, a processor 301 may call and execute at least one instruction among one or more instructions stored in the storage medium. This makes it possible for the device to be operated to perform at least one function according to the at least one instruction called. The one or more instructions may include codes generated by a compiler or codes executable by an interpreter. The machine-readable storage medium may be provided in the form of a non-transitory storage medium. Here, "non-transitory" means that the storage medium is a tangible device, and does not include a signal (for example, electromagnetic waves), and the term does not distinguish between the case where data is stored semi-permanently on a storage medium and the case where data is temporarily stored thereon.

Although various flowcharts are disclosed to describe the embodiments of the present invention, this is for convenience of description of each step, and each step is not necessarily performed according to the order of the flowchart. That is, the operations in the flowchart may be performed simultaneously with each other, performed in an order according to the flowchart, or performed in an order opposite to the order in the flowchart.

FIG. 1 is a diagram illustrating an example of a computing device in which software-based object tracking is performed according to an embodiment of the present application.

Referring to FIG. 1, a computing device 100 is fixed in a forward direction to perform capturing. The computing device 100 identifies an object from the captured image of the front, and extracts a window area 11 (hereinafter referred to as a viewing window 11) for display displayed on a user terminal focused on the object among the entire captured image 10 and displays the extracted window area 11 on the user terminal (101).

The computing device 100 may provide a software-based object tracking function to a user by changing the viewing window 11 in response to movement of an object in each frame (hereinafter referred to as a captured image frame) of captured forward images. That is, in the present application, the computing device 100 may set a resolution of the viewing window 11 to be smaller than the resolution of the preset captured image frame, and set the viewing window to be changed as an object moves within a captured image frame captured in a fixed forward direction, thereby providing the software-based object tracking function to the user without physically rotating or changing a camera unit of the computing device 100.

The computing device 100 may include a camera and may be a user-portable electronic device. For example, the computing device 100 may include a mobile phone, a smartphone, a laptop computer, a digital broadcasting terminal, a personal digital assistant (PDA), a portable multimedia player, a navigation device, a slate PC, a tablet PC, an ultrabook, a wearable device (e.g., a smartwatch, smart glasses, a head mounted display), or the like.

Figure 2:
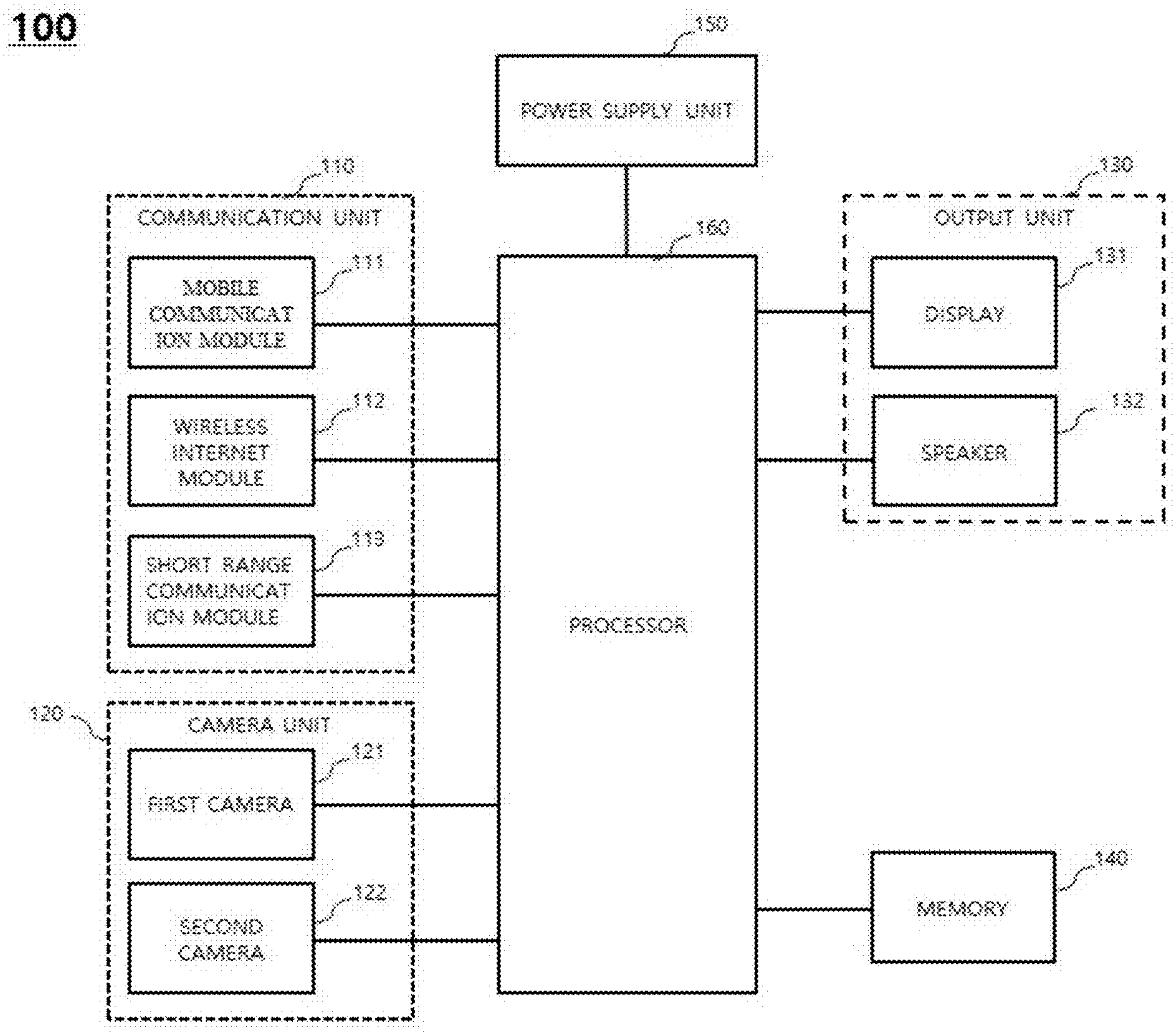
FIG. 2 is a diagram illustrating an exemplary computing operating environment of a computing device according to an embodiment of the present application.

FIG. 2 is a diagram illustrating an exemplary computing operating environment of a computing device according to an embodiment of the present application.

Referring to FIG. 2, the computing device 100 includes a communication unit 110, a camera unit 120, an output unit 130, a memory 140, a power supply unit 150, and a processor 160. The components illustrated in FIG. 2 are not essential to implementing the computing device, and the computing device described herein may have more or fewer components than those listed above.

The communication unit 110 may include one or more modules enabling communication between the computing device 100 and a wireless communication system or between the computing device 100 and other computing devices. The communication unit 110 may include a mobile communication module 211, a wireless Internet module 212, and a short range communication module 213. The short range communication module 213 may perform a communication connection with a terminal cradle by wire or wirelessly. For example, the short range communication module 213 may include a short range wireless communication module such as Bluetooth or a wired communication module such as RS232.

The camera unit 120 or the camera module may include at least one camera. The camera unit 120 may include one or more lenses, image sensors, image signal processors, or flashes.

For example, the camera unit 120 may include a first camera 221 and a second camera 222. The first camera 221 or the second camera 222 may capture a front image of the computing device 100.

The output unit 130 is for generating an output related to sight, hearing, or touch, and may include a display 131 and a speaker 132. The display 131 may form a layer structure with or be integrally formed with the touch sensor, thereby implementing a touch screen. The touch screen may function as a user input unit which provides an input interface between the computing device 100 and a user, and may provide an output interface between the computing device 100 and the user.

The power supply unit 150 receives power from an external power supply and an internal power supply under the control of the processor 160 and supplies the received power to each component included in the computing device 100. The power supply unit 150 includes a battery, which may be a built-in battery or a replaceable battery.

The processor 160 may control at least some of the components described with reference to FIG. 2 in order to drive an application program stored in the memory 140, that is, the application. In addition, the processor 160 may operate at least two or more of the components included in the computing device 100 in combination with each other in order to drive the application program.

The processor 160 may drive an application by executing instructions stored in the memory 140. In the following description, the processor 160 is expressed as a subject of control, instruction, or function by driving an application, but this means that the processor 160 operates by driving instructions or applications stored in the memory 140.

At least some of the components may operate in cooperation with each other in order to implement an operation, a control, or a control method of the computing device 100 according to various embodiments described below. Also, the operation, control, or control method of the computing device 100 may be implemented on the computing device by driving at least one application program stored in the memory 140.

The processor 160 generally controls the overall operation of the computing device 100 in addition to the operation related to the application program. The processor 260 may provide or process appropriate information or a function to a user by processing signals, data, information, and the like, which are input or output through the above-described components, or by driving an application program stored in the memory 240. The processor 160 may be implemented as one processor or a plurality of processors.

Components illustrated in FIG. 7 described below may be functions or software modules implemented in the processor 260 according to instructions stored in the memory 240.

Meanwhile, the control method performed by the computing device 100 according to the above-described embodiment may be implemented as a program and provided to the computing device 100. For example, a program including the control method of the computing device 100 may be provided by being stored in a non-transitory computer readable medium.

Figure 3:
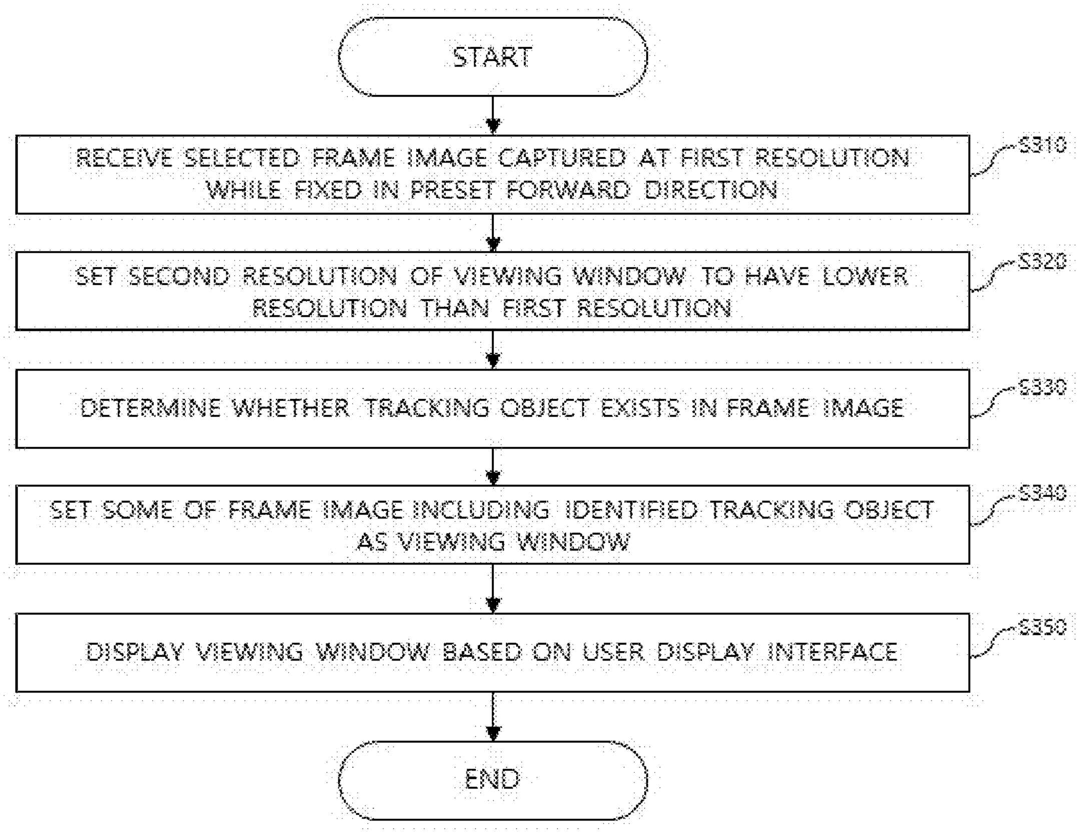
FIG. 3 is a flowchart for describing a software-based object tracking method according to an embodiment of the present application.
Figure 4:
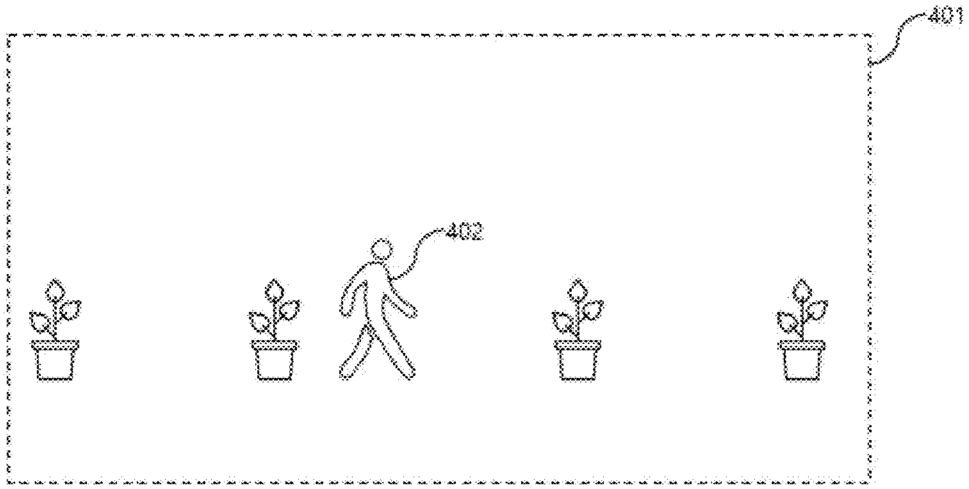
FIGS. 4 to 6 are diagrams for describing the software-based object tracking method illustrated in FIG. 3.
Figure 5:
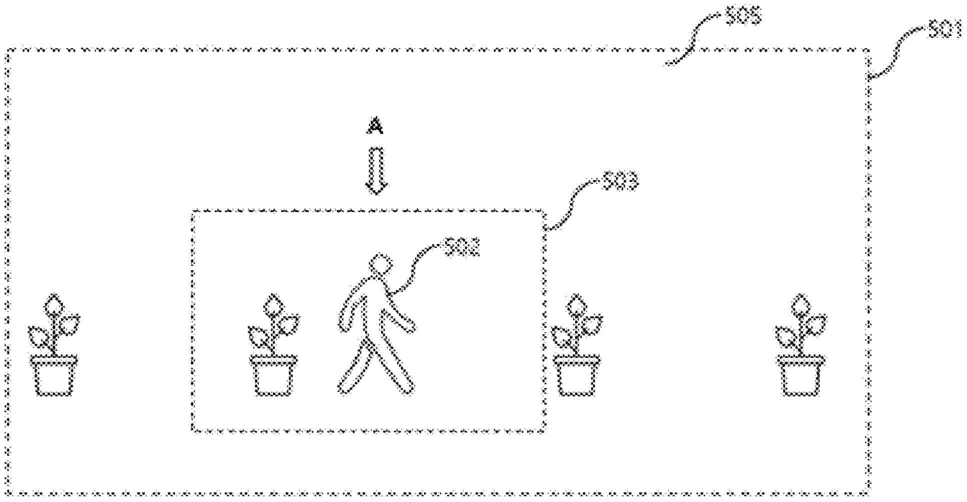
Figure 6:
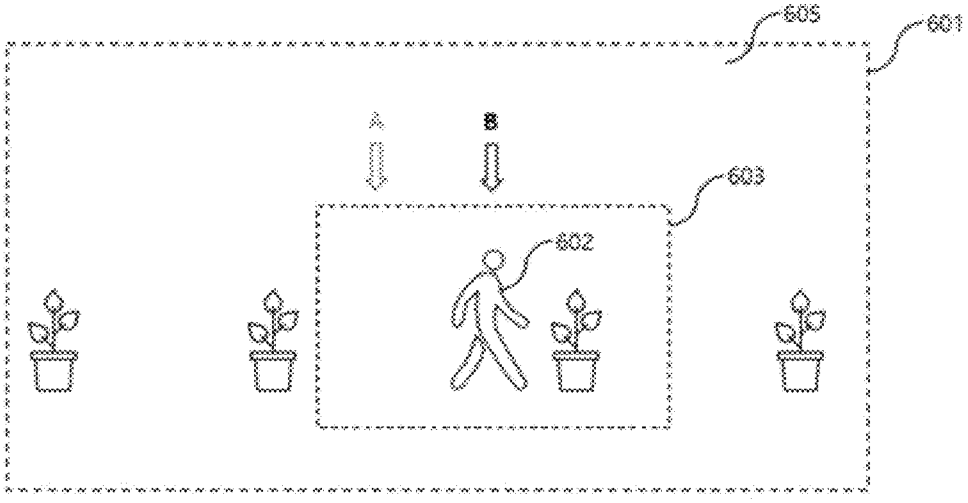

FIG. 3 is a flowchart for describing a software-based object tracking method according to an embodiment of the present application, and FIGS. 4 to 6 are diagrams for describing the software-based object tracking method illustrated in FIG. 3. The software-based object tracking method illustrated in FIG. 3 is described in each operation performed by driving the processor 160 of the computing device 100 illustrated in FIG. 2.

Referring to FIG. 3, the processor 160 controls the camera module to generate a selected frame image in a forward direction and receives the generated frame image (S310). The camera module is fixed in a preset forward direction regardless of existence or movement of the tracking object, and performs capturing at a first resolution to generate the frame image. FIG. 4 illustrates such an example and illustrates that an object 402 is being captured so that the object 402 exists in the frame image 401.

The processor 160 may set a second resolution of the viewing window to have a lower resolution than the first resolution captured by the camera module (S320). For example, the resolution of the viewing window may be determined based on a user's input. As another example, the processor 160 may dynamically change the resolution of the viewing window while providing the object tracking function according to the size of the tracking object in the frame image.

The processor 160 may identify whether the tracking object exists in the frame image (S330), and set a partial area of the frame image including the tracking object as the viewing window based on the location of the tracking object in the frame image (S330). FIG. 5 illustrates such an example, and after identifying a tracking object 502 in a frame image 501, a viewing window 503 may be set around a search object. The processor 160 may display a viewing window based on a user display interface (S350). That is, only the viewing window 503 is displayed on the user display interface rather than the entire captured frame image, and a remaining area 505 excluding the viewing window may not be displayed on the user display interface.

The processor 160 may repeatedly perform the above-described process of setting a viewing window for all or at least some of the consecutive frame images (referred to as captured frame images) captured by the camera module. FIG. 6 illustrates a captured frame image 601 captured after a certain time has elapsed in FIG. 5, and comparing FIG. 5 and FIG. 6, it can be seen that a tracking object 602 has moved from position A to position B. The processor 160 may reset a location of a viewing window 603 in response to the movement of the tracking object 602, and thus it can be seen that the viewing window 503 of FIG. 5 and the viewing window 603 of FIG. 6 are set differently.

Hereinafter, various control features of the processor 260 will be described with reference to FIGS. 7 to 20.

Figure 7:
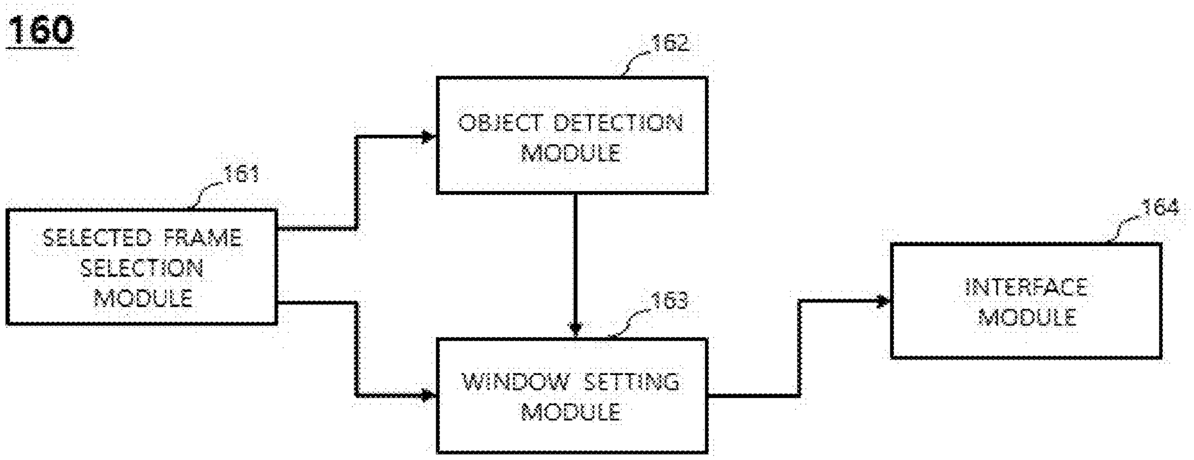
FIG. 7 is a block configuration diagram for describing a controllable function block of a computing device according to an embodiment of the present application.

FIG. 7 is a block diagram for describing functions performed by the processor 160. The components, that is, modules, illustrated in FIG. 7 may each be a function or software module implemented in the processor 260 according to instructions stored in the memory 240. However, hereinafter, each module of the processor 160 is expressed as a subject of control, instruction, or function, but this means that the processor 160 operates by driving instructions or applications stored in the memory 140.

Referring to FIG. 7, the processor 160 may include a selected frame selection module 161, an object detection module 162, a window setting module 613, and an interface module 164.

The selected frame selection module 161 may determine the frame image (referred to as the selected frame image) to set the viewing window. The camera module performs capturing at a preset frame rate to generate a captured frame image, and provides the generated captured frame image to the selected frame selection module 161 (S810). The selected frame selection module 161 may extract at least some of the captured frame images and determine some of the extracted captured frame images as a selected frame image for setting a viewing window.

For example, the selected frame selection module 161 may set the entire captured frame image as the selected frame image. This example is suitable when the computing device 100 has sufficient resources.

As another example, the selected frame selection module 161 may extract some of the captured frame images and set some of the extracted captured frame images as the selected frame image. These other examples are suitable when computing resources are limited, such as in a mobile computing environment.

Figure 8:
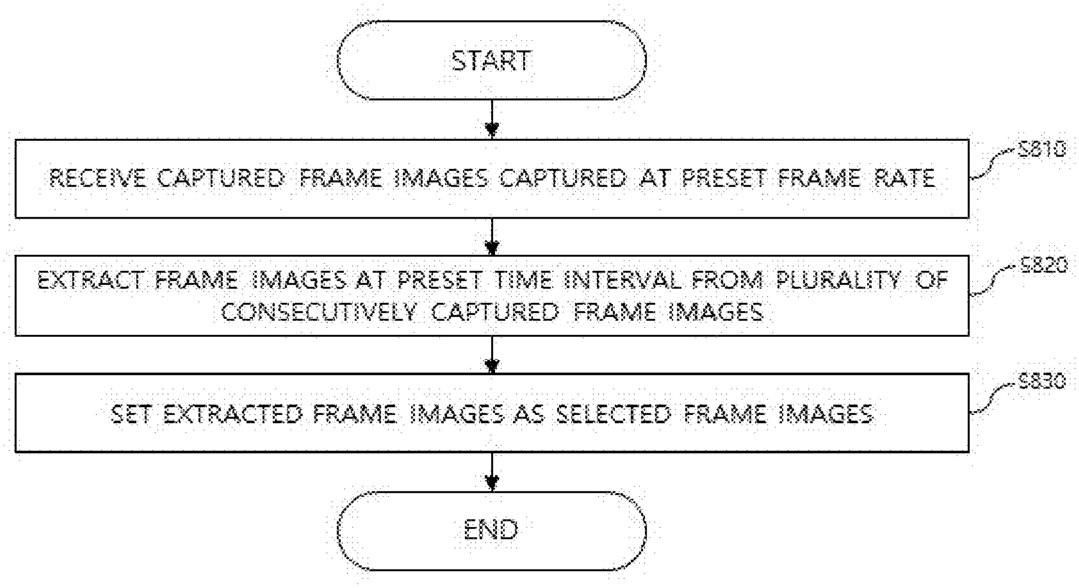
FIG. 8 is a flowchart for explaining an embodiment of a method for providing object tracking performed in a selected frame selection module illustrated in FIG. 7.
Figure 9:
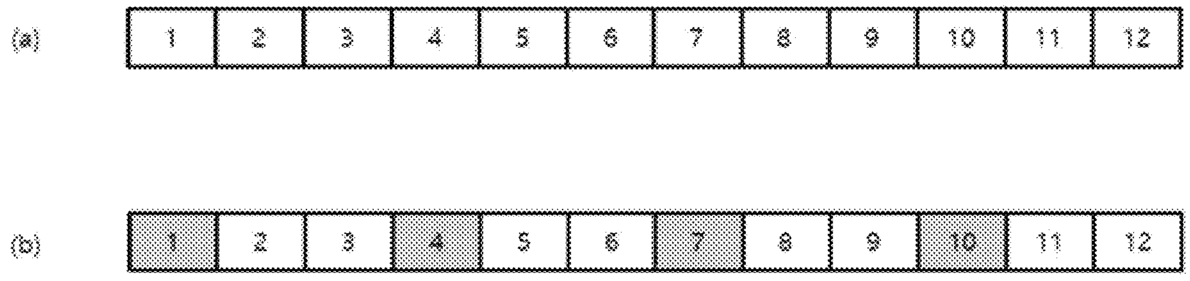
FIG. 9 is a diagram for describing an embodiment illustrated in FIG. 8.

As an embodiment, FIG. 8 discloses an example of a selected frame selection method performed by the selected frame selection module 161. Referring to FIG. 8, the selected frame selection module 161 performs capturing at a preset frame rate and receives the captured frame image from the camera module (S810). The selected frame selection module 161 may set selected frame images at time intervals having a lower frequency than the frame rate. That is, the selected frame selection module 161 may extract a frame image from among a plurality of time sequentially captured frame images at a preset time interval (S820), and set the extracted frame image as the selected frame image (S830). FIG. 9 is a diagram for describing this embodiment. FIG. 9A illustrates captured frame images 1 to 12 time sequentially captured by the camera module, and FIG. 9B illustrates frame images 1, 4, 7, and 10 extracted as the selected frame images by the selected frame selection module 161 among the captured frame images 1 to 12. In one embodiment of FIGS. 8 and 9, the selected frame images are extracted at equal time intervals.

Figure 10:
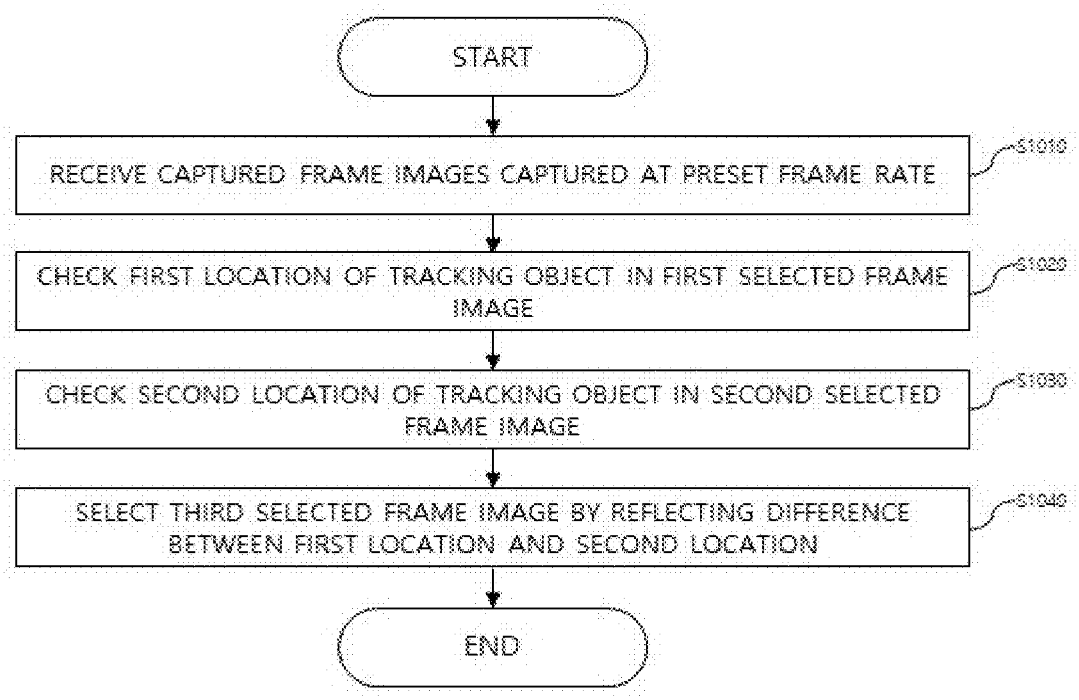
FIG. 10 is a flowchart for describing another embodiment of a method of providing object tracking performed in a selected frame selection module illustrated in FIG. 7.
Figure 11:
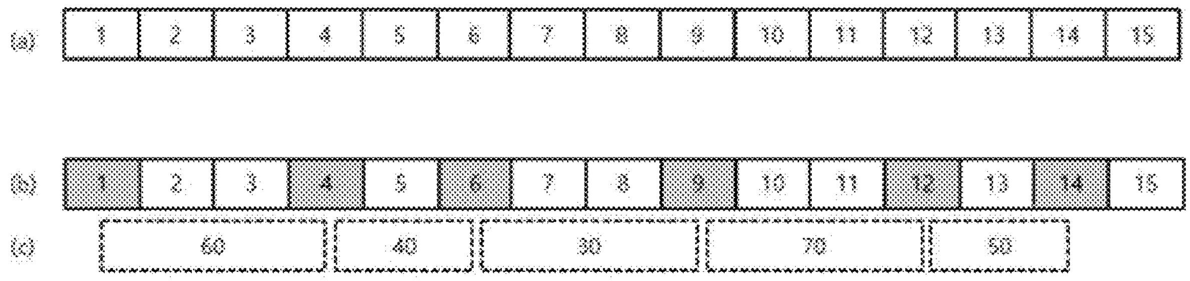
FIG. 11 is a diagram for describing another embodiment illustrated in FIG. 10.

As another embodiment, FIG. 10 discloses another example of a selected frame selection method performed by the selected frame selection module 161. Referring to FIG. 10, the selected frame selection module 161 performs capturing at a preset frame rate and receives the captured frame image from the camera module (S1010). The selected frame selection module 161 checks a first location of a tracking object in a previous first selected frame image (S1020) and checks a second location of a tracking object in a current second selected frame image (S1030). The selected frame selection module 161 may determine a next selected frame image according to a difference between the first location of the tracking object in the previous first selected frame image and the second location of the tracking object in the current second selected frame image. The selected frame selection module 161 select third selected frame image by reflecting difference between first location and second location (S1040). That is, when the movement of the tracking object is fast, the selected frame selection module 161 may select the next selected frame image more quickly. FIG. 11 is a diagram for describing this embodiment. FIG. 11A illustrates captured frame images 1 to 12 time sequentially captured by the camera module, FIG. 11B illustrates frame images 1, 4, 6, 9, 12, and 14 extracted as the selected frame images by the selected frame selection module 161 among the captured frame images 1 to 12, and FIG. 11C illustrates a distance between the object location in the previous selected frame image and the object in the current selected frame image. After extracting the selected frame image 4, as a result of calculating a movement distance (for example, the number of unit pixels (for example, 10 pixels, etc.) in which the tracking object moves, etc.) between the object in the previous selected frame image 1 and the current selected frame image 4, the selected frame selection module 161 determines the movement distance to be 60. since the moving distance of the tracking object is 60, which exceeds the standard (for example, 40) of the movement distance, the selection frequency of the selected frame image increases to extract a sixth captured frame image as the selected frame image. Meanwhile, in sixth and ninth frame images, the moving distances of the tracking object are 40 and 30, which are below the standard, so the ninth and twelfth frame images are extracted. Meanwhile, in the twelfth frame image, since the moving distance of the tracking object is 70, which exceeds the standard (for example, 40) of the movement distance, the selection frequency of the selected frame image increases to extract a fourteenth captured frame image as the selected frame image. In this way, the software-based tracking may be performed more smoothly by adjusting the selection frequency of the viewing window according to the movement distance of the tracking object in the viewing window.

Referring back to FIG. 7, the object detection module 162 may identify whether the tracking object exists in the selected frame image.

Figure 12:
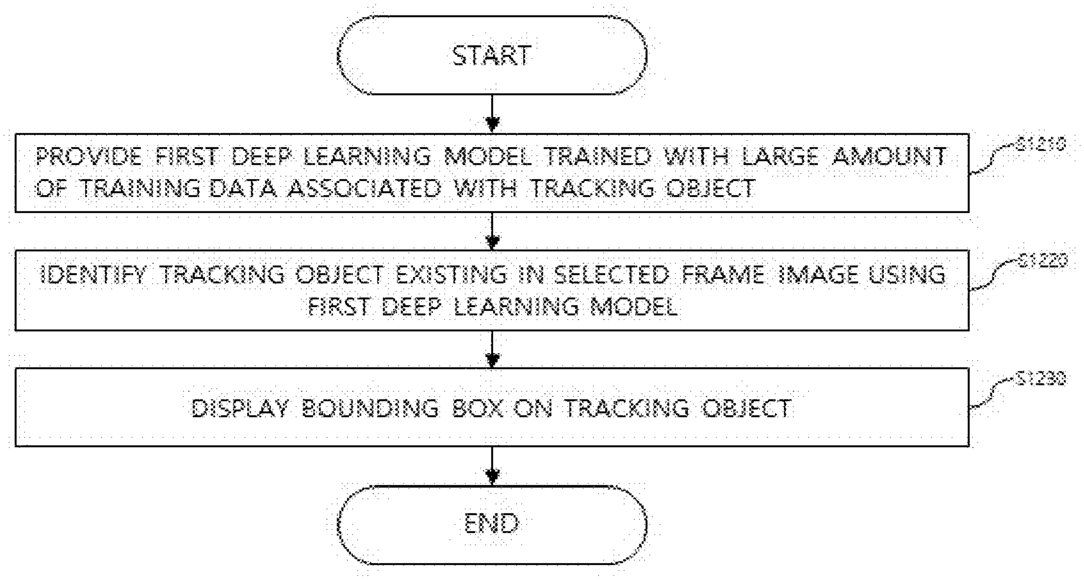
FIG. 12 is a flowchart for describing an embodiment of a method of providing object tracking performed in an object detection module illustrated in FIG. 7.

In an embodiment, as in the example illustrated in FIG. 12, the object detection module 162 may perform the deep learning-based object detection. Referring to FIG. 12, the object detection module 162 may include a first deep learning model trained with a large amount of training data associated with the tracking object (S1210). The first deep learning model may be an artificial neural network model trained with a large amount of training data in which a tracking object is displayed, and various models such as CNN and RNN may be applied to the structure of the artificial neural network. The object detection module 162 may identify the tracking object existing in the selected frame image using the first deep learning model (S1220). The object detection module 162 may display a bounding box on the tracking object identified in the selected frame image (S1230), and the window setting module 613 may set the viewing window based on the bounding box.

As an example of the tracking object, in addition to things associated with people, such as a person's face, a person's torso, and the overall shape of a person, various objects, such as horses and dogs, may be set as tracking objects. This is because the tracking object is set according to the training data of the first deep learning model. The first deep learning model can be trained and tracked in various ways, such as being trained to detect at least some of one or several objects according to settings.

Figure 13:
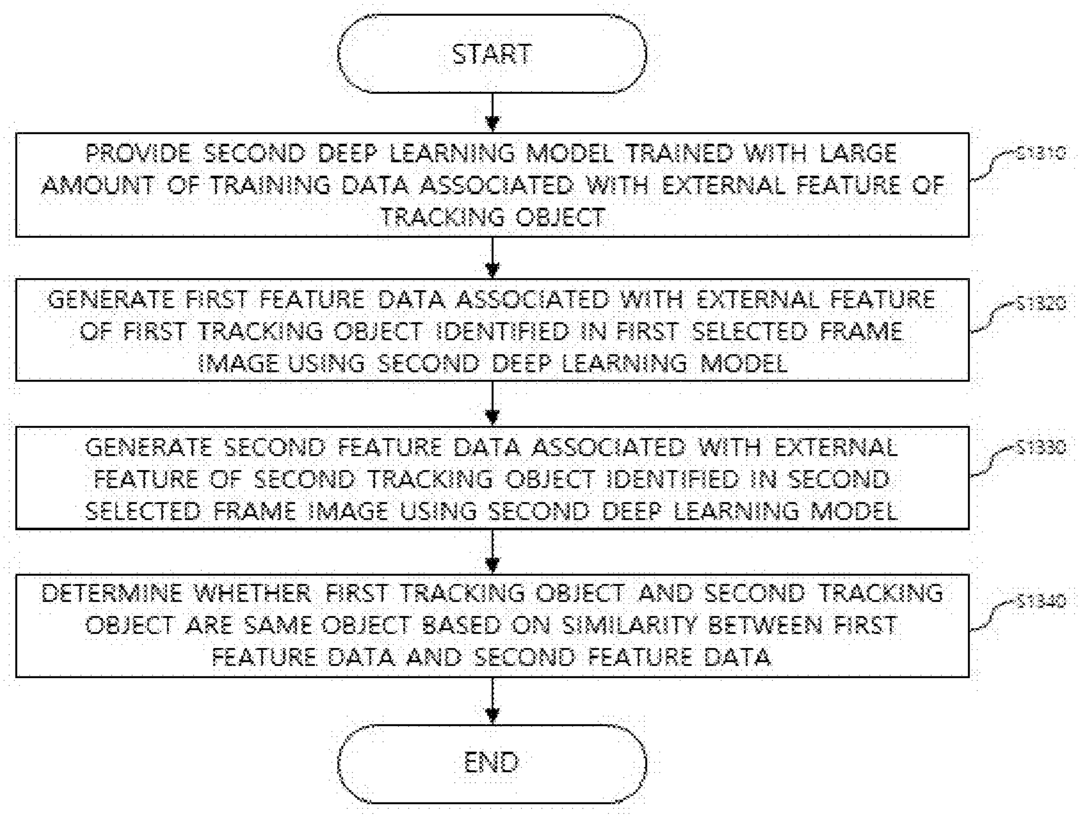
FIG. 13 is a flowchart for describing another embodiment of a method of providing object tracking performed by the object detection module illustrated in FIG. 7.
Figure 14:
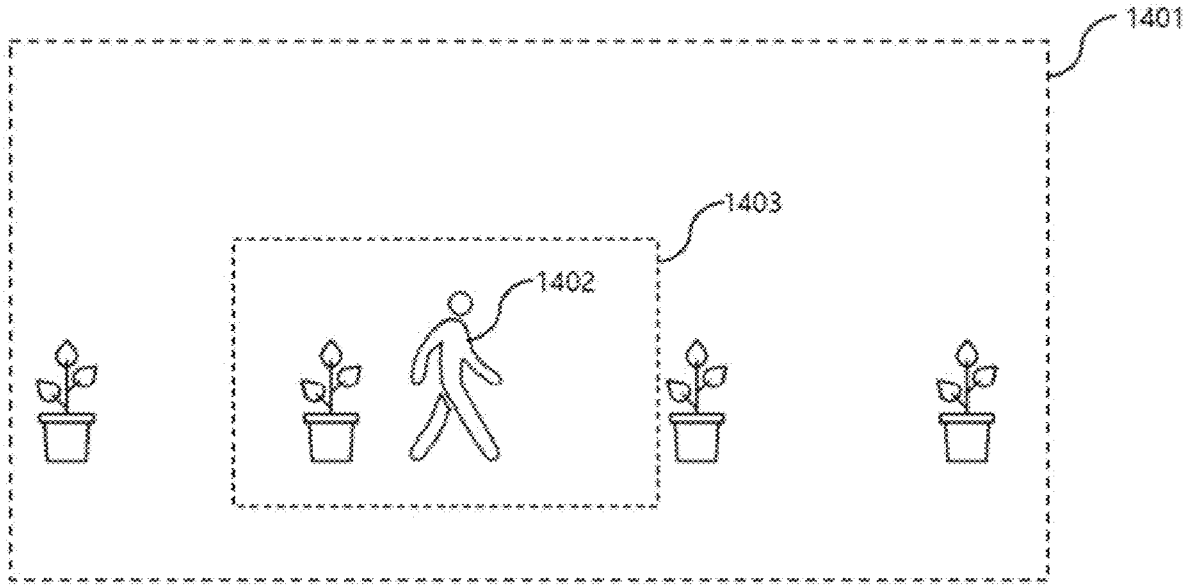
FIGS. 14 and 15 are diagrams for describing another embodiment illustrated in FIG. 13.
Figure 15:
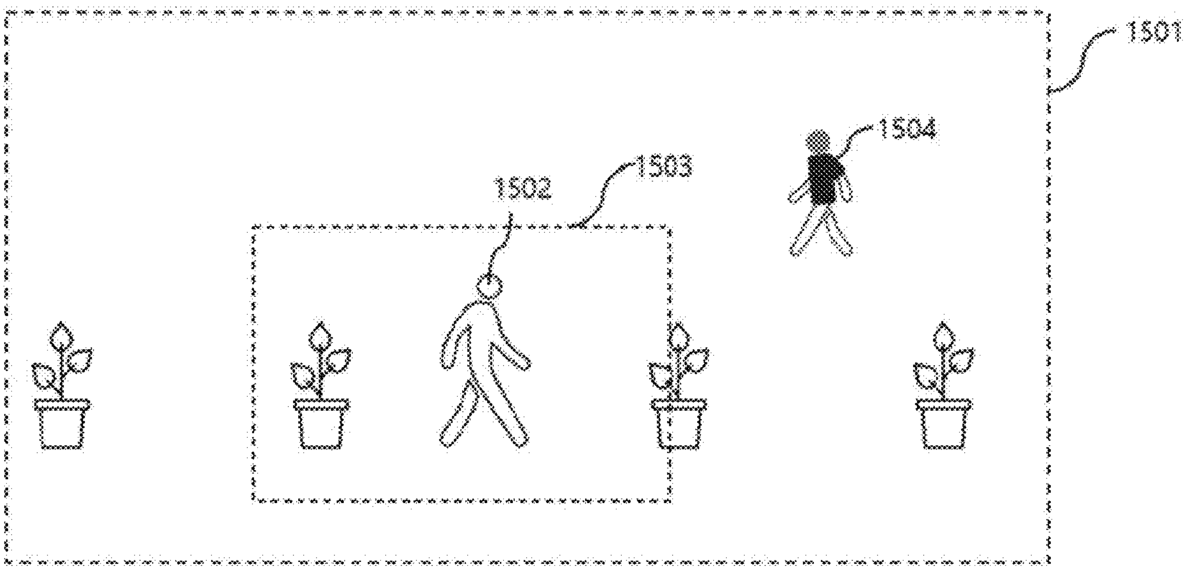

In an embodiment, as in the example illustrated in FIG. 13, the object detection module 162 may determine the identity of the previous tracking object and the current tracking object using a separate deep learning model. Since the first deep learning model identifies and classifies objects, all the same objects, for example, people, are identified as the tracking objects. As a result, in this embodiment, only the same object, e.g., the same person, may be set as a tracking object using a separate second deep learning model. Referring to FIG. 13, the object detection module 162 may include a second deep learning model trained with a large amount of training data associated with external features of the tracking object (S1310). The second deep learning model may be an artificial neural network model trained with a large amount of training data to determine a similarity based on the external features of the tracking object. The object detection module 162 may generate first feature data associated with the external features of the first tracking object identified in the first selected frame image using the second deep learning model (S1320), and generate the second feature data associated with the external feature of the second tracking object identified in the second selected frame image (S1330). The object detection module 162 may determine whether the first tracking object and the second tracking object are the same object based on the similarity between the first feature data and the second feature data (S1340). According to the embodiment, the object detection module 162 may determine whether the object is the same object by directly generating data (e.g., a feature vector) for similarity determination without generating feature data. FIGS. 14 and 15 illustrate such an example. In the example of FIG. 14, when a tracking object 1402 is detected in a first selected frame image 1401, a viewing window 1403 is set based on the tracking object 1402. FIG. 15 is a second selected frame image 1501 after FIG. 14. The object detection module 162 may detect two objects 1502 and 1504 in the second selected frame image 1501. The object detection module 162 may determine whether the first tracking object 1402 in the first selected frame image 1401 and the two objects 1502 and 1504 in the second selected frame image 1501 are the same object to determine the second tracking object 1502, and it can be seen that the viewing window 1503 is set based on the second tracking object 1502.

Referring back to FIG. 7, the window setting module 613 may set at least a partial area in the selected frame image as the viewing window based on information (for example, a bounding box) provided by the object detection module 162.

Figure 16:
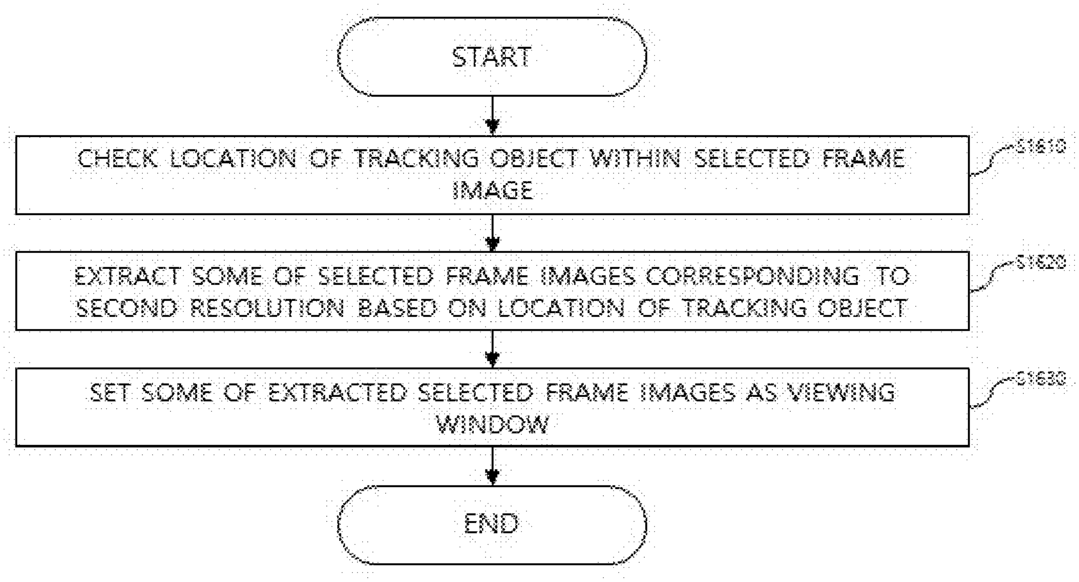
FIG. 16 is a flowchart illustrating an embodiment of a method of providing object tracking performed in a window setting module illustrated in FIG. 7.

FIG. 16 is a flowchart for describing the operation of the window setting module 613. Referring to FIG. 16, the window setting module 613 may check the location of the tracking object within the selected frame image based on the information (for example, a bounding box) provided by the object detection module 162 (S1610). The window setting module 613 may extract a part of the selected frame image corresponding to the second resolution based on the location of the tracking object (S1620), and set a part of the extracted selected frame image as the viewing window (S1630).

The window setting module 613 may equally set the viewing window determined in the latest selected frame image for the captured frame image other than the selected frame image. This is the case when some of the captured frame images are set as the selected frame image rather than all the captured frame images. For example, in at least one non-selected frame image time sequentially displayed after the first selected frame image, the viewing window determined in the first selected frame image may be set to be the same, that is, to the same location.

Figure 17:
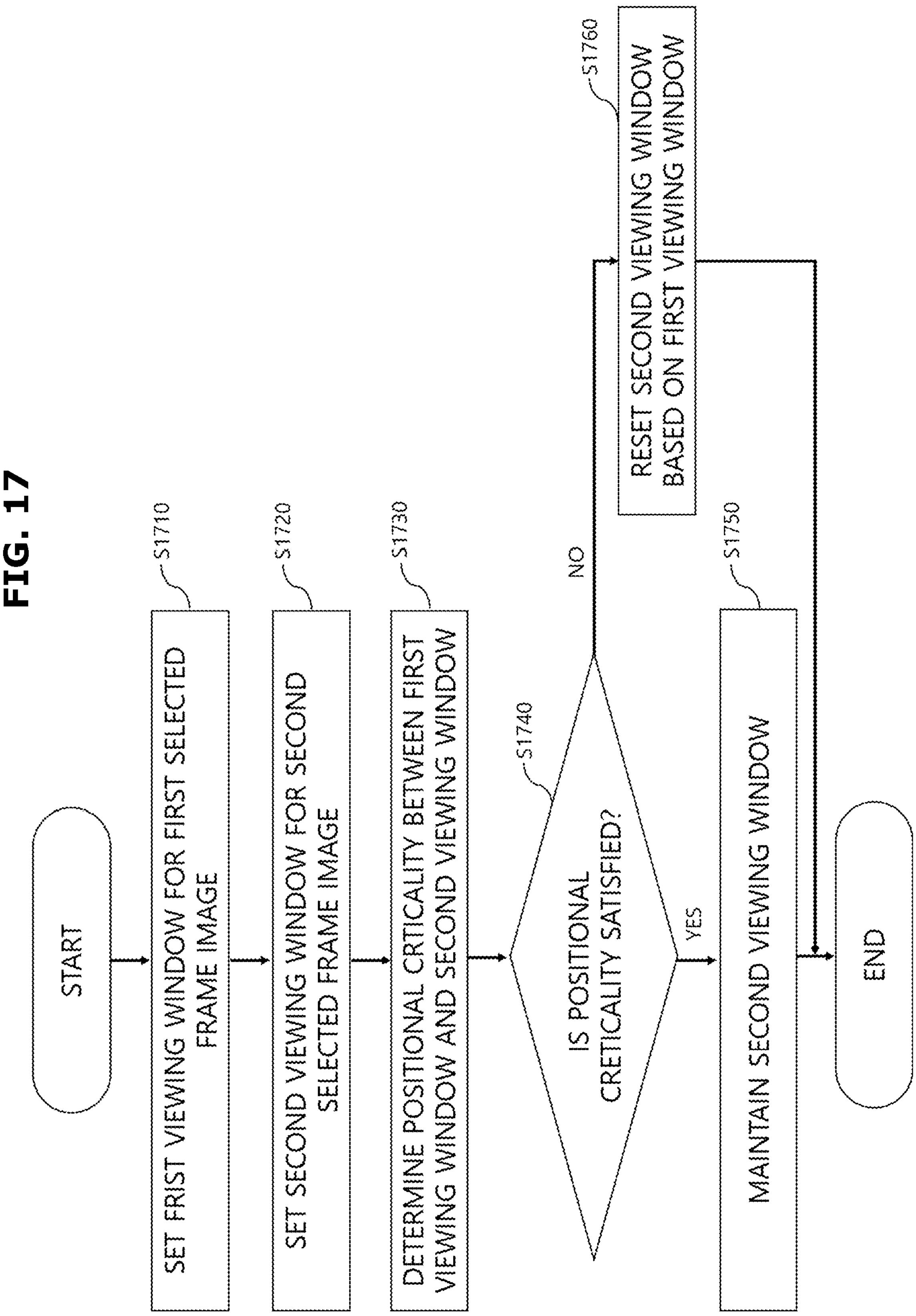
FIG. 17 is a flowchart illustrating another embodiment of a method of providing object tracking performed in a window setting module illustrated in FIG. 7.
Figure 18:
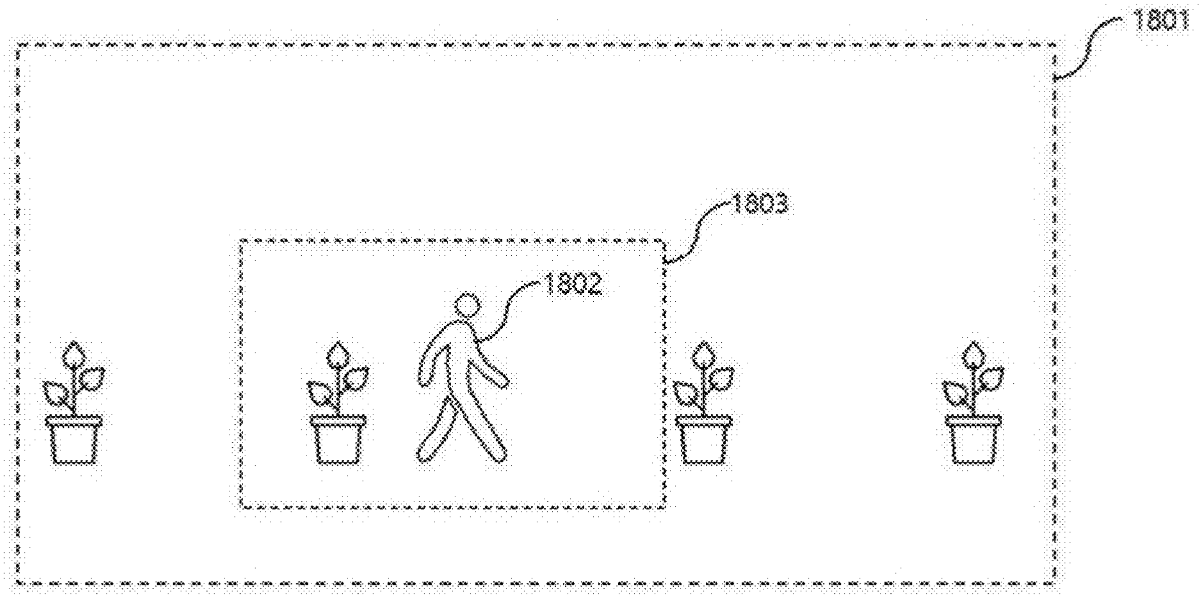
FIGS. 18 to 20 are diagrams for describing another embodiment illustrated in FIG. 17.
Figure 19:
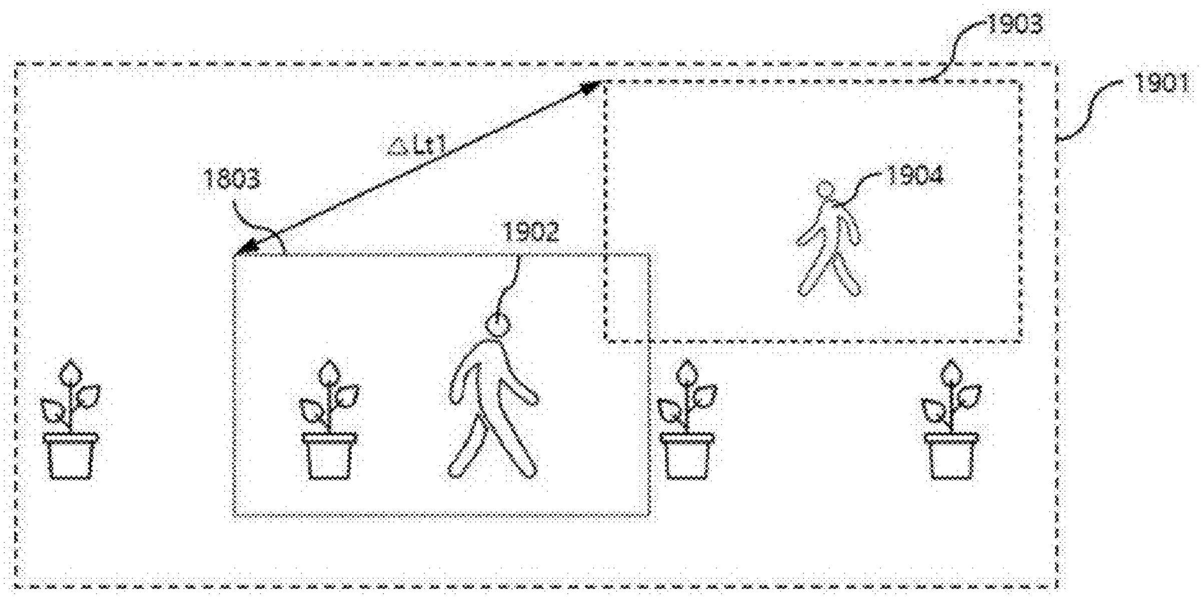
Figure 20:
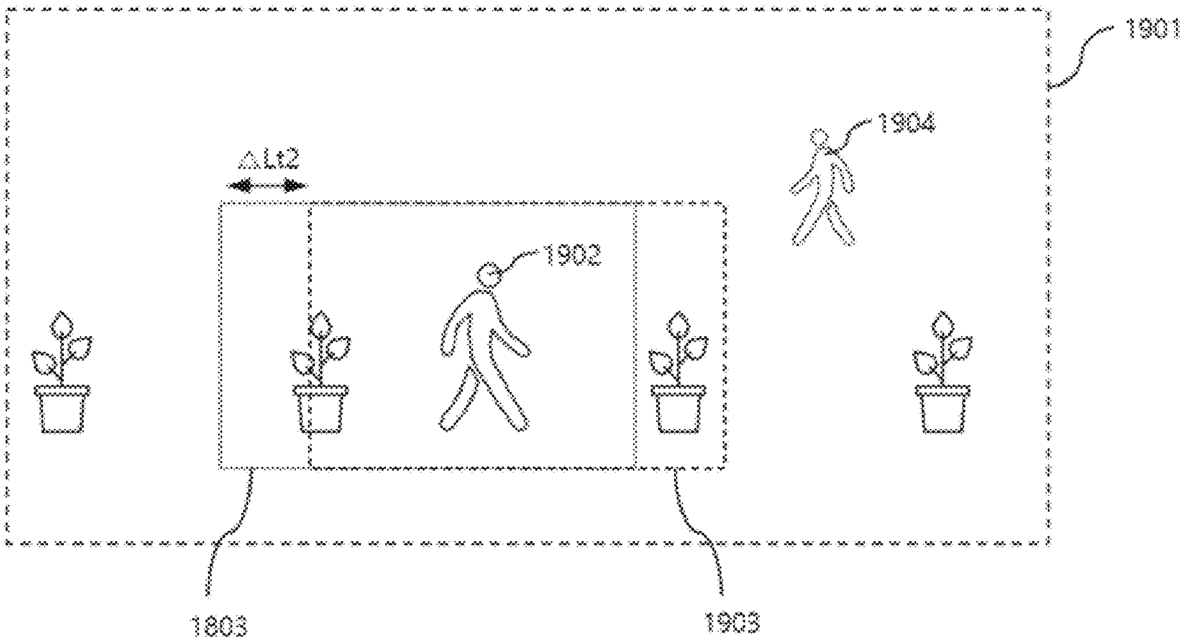

In an embodiment, as in the example illustrated in FIG. 17, when the viewing window in the previous selected frame image and the viewing window in the current selected frame image are separated by a certain distance or more, the window setting module 613 may correct the viewing windows. This will be described with reference to FIGS. 17 to 20. The window setting module 613 may set a first viewing window 1803 for a first selected frame image 1801 (see FIG. 18) (S1710) and a second viewing window 1903 for a second selected frame image 1901 (see FIG. 19) (S1720). The window setting module 613 may determine positional criticality between the first viewing window and the second viewing window (S1730) to determine whether the positional criticality is satisfied (S1740). The positional criticality may be set to a change distance of a viewing window that is set in proportion to a time interval between selected frames (e.g., the number of frame rates). In the example of FIG. 19, the window setting module 613 calculates a distance ΔLt1 between the location of the first viewing window 1803 (see FIG. 19) in the first selected frame image and a second viewing window 1904 selected in the second selected frame image based on an upper left corner, and determines the positional criticality based on the calculated distance. The example of FIG. 19 is an example out of positional criticality, and as in the example illustrated in FIG. 20, the window setting module 613 may reset the second viewing window 1903 based on the location of the first viewing window 1803 in the previous first selected frame image. When the positional criticality is satisfied, the window setting module 613 maintains the second viewing window (S1750). In this embodiment, when an error occurs as externally similar objects are detected at the same time, it is possible to prevent an error in tracking by performing the correction using only the viewing window itself.

In an embodiment, the window setting module 613 may adjust the size of the viewing window corresponding to the size of the tracking object. For example, there may occur a case where the size of the second tracking object in the second selected frame image is reduced more than the size of the first tracking object in the first selected frame image by a certain amount or more. The window setting module 613 may set the size of the second viewing window in the second selected frame image to be smaller than the size of the first viewing window in the first selected frame image by reflecting the reduced ratio. For example, this corresponds to the case where the human object moves away from the computing device. In this case, the size of the viewing window may be reduced, and the size of the human object relative to the viewing window may be controlled to be maintained.

The interface module 164 may display a user display interface based on the viewing window provided by the window setting module 613.

For example, the resolution of the user display interface and the resolution of the viewing window may be different, and the interface module 164 may enlarge or reduce the resolution of the viewing window to correspond to the resolution of the user display interface. Since the resolution of the viewing window is variable, the resolution of the viewing window is enlarged or reduced according to the resolution of the user display interface without being limited to the absolute size of the viewing window, thereby providing the effects such as zooming in and zooming out on the user.

According to an embodiment disclosed in the present application, it is possible to effectively track an object based on software for an image captured in a certain fixed direction.

According to an embodiment disclosed in the present application, it is possible to quickly and accurately perform identification and identity determination of an object by identifying a tracking object within a frame image using a first deep learning model trained with a large amount of training data to identify a tracking object and determining identity of the tracking object using a second deep learning model trained with a large amount of training data associated with the external features of the tracking object.

According to an embodiment disclosed in the present application, it is possible to provide higher tracking performance by resetting a viewing window based on positional criticality of the viewing window in consecutive frame images to prevent an error in setting of the viewing window due to an error or misrecognition of other objects.

The present invention described above is not limited by the above-described embodiments or the accompanying drawings, but is limited by the claims described below, and it can be readily understood by those skilled in the art that the configuration of the present invention may be variously changed and modified within the scope not departing from the technical spirit of the present invention.

The present invention was filed overseas with the support of the following research projects supported by the Korean government.

Research project information

Department name: Korea Tourism Organization

Research project name: Follow-up support for leading global tourism companies

Project name: Smartphone-linked automatic person/object recognition and tracking device Organizer: 3i Corporation Research period: 2022 Mar. 4 to 2022 Dec. 31

What is claimed is:

1. A software-based object tracking method that is a method of providing object tracking performed in a computing device including a camera module, the software-based object tracking method comprising:

receiving a selected frame image captured at a first resolution from the camera module;

setting a second resolution for a viewing window;

identifying whether a tracking object exists in the selected frame image; and setting a partial area of the selected frame image including the tracking object as the viewing window on the basis of a location of the tracking object within the selected frame image, wherein the second resolution of the viewing window is a resolution lower than the first resolution of the selected frame image, and wherein the viewing window is configured to automatically move and be size-adjusted in response to the location and scale of the tracking object, and the selected frame image within the viewing window is processed in a manner corresponding to panning or zooming on the tracking object while the camera module remains fixed, wherein the identifying includes identifying the tracking object using a first deep learning model, and wherein determining whether the tracking object identified in different selected frame images corresponds to a same object includes generating feature data using a second deep learning model and determining the same object based on a similarity between feature data, and wherein determining positional criticality by calculating a distance between a first viewing window set for a first selected frame image and a second viewing window set for a second selected frame image, and resetting the second viewing window based on the first viewing window when the positional criticality is not satisfied.

2. The software-based object tracking method of claim 1, further comprising displaying the viewing window based on a user display interface.

3. The software-based object tracking method of claim 2, wherein the camera module is fixed in a preset forward direction regardless of existence or movement of the tracking object and performs capturing at the first resolution to generate the selected frame image.

4. The software-based object tracking method of claim 3, wherein the first resolution of the selected frame image is preset and fixed, and the second resolution of the viewing window is variable while providing an object tracking function.

5. The software-based object tracking method of claim 3, wherein the receiving of the selected frame image captured at the first resolution from the camera module includes:

receiving a plurality of time sequentially captured frame images at a preset frame rate from the camera module; and extracting some frame images from among the plurality of time sequentially captured frame images and setting each of the extracted frame images as the selected frame image.

6. The software-based object tracking method of claim 1, wherein the first deep learning model is trained with a large amount of training data associated with the tracking object.

7. The software-based object tracking method of claim 6, wherein the determining whether the tracking object identified in different selected frame images corresponds to a same object includes determining whether a first tracking object identified in a first selected frame image and a second tracking object identified in a second selected frame image are the same object.

8. The software-based object tracking method of claim 7, wherein the determining of whether the second tracking object identified in the second selected frame image is the same object includes:

generating first feature data associated with an external feature of the first tracking object identified in the first selected frame image using a second deep learning model trained with a large amount of training data associated with an external feature of the tracking object;

generating second feature data associated with an external feature of the second tracking object identified in the second selected frame image; and determining whether the first tracking object and the second tracking object are the same object based on a similarity between the first feature data of the first tracking object and the second feature data of the second tracking object.

9. The software-based object tracking method of claim 2, wherein the setting of the partial area of the selected frame image including the tracking object as the viewing window includes:

checking a location of the tracking object within the selected frame image;

extracting some of the selected frame image corresponding to the second resolution based on the location of the tracking object; and setting some of the extracted selected frame image as the viewing window.

10. The software-based object tracking method of claim 9, wherein the setting of the partial area of the selected frame image including the tracking object as the viewing window includes:

determining positional criticality between a first viewing window for a first selected frame image and a second viewing window for a second selected frame image; and resetting the second viewing window based on the first viewing window when the positional criticality is not satisfied, wherein the determining positional criticality includes comparing the calculated distance between the first viewing window and the second viewing window with a preset distance threshold.

11. A software-based object tracking method that is a method of providing object tracking performed in a computing device including a camera module fixed in a preset forward direction to generate a captured frame image, the software-based object tracking method comprising:

receiving a plurality of captured frame images time sequentially captured at a first resolution from the camera module;

selecting at least one selected frame image by extracting at least some of the plurality of captured frame images;

identifying whether a tracking object exists in the at least one selected frame image;

identifying the tracking object in the at least one selected frame image using a first deep learning model;

generating feature data for the tracking object using a second deep learning model;

determining whether the tracking object identified in different selected frame images corresponds to a same object based on a similarity between feature data;

setting each of partial areas of the at least one selected frame image including the tracking object as the viewing window on the basis of a location of the tracking object within the at least one selected frame image;

controlling the viewing window to automatically move and be size-adjusted in response to the location and scale of the tracking object;

processing the at least one selected frame image within the viewing window in a manner corresponding to panning or zooming on the tracking object while the camera module remains fixed;

determining positional criticality by calculating a distance between a first viewing window set for a first selected frame image and a second viewing window set for a second selected frame image; and resetting the second viewing window based on the first viewing window when the positional criticality is not satisfied.

12. A computing device comprising:

a memory configured to store one or more instructions; and at least one processor configured to execute the one or more instructions stored in the memory, wherein the at least one processor executes the one or more instructions to receive a selected frame image captured at a first resolution from the camera module, set a second resolution for a viewing window, identify whether a tracking object exists in the selected frame image, and set a partial area of the selected frame image including the tracking object as the viewing window on the basis of a location of the tracking object within the selected frame image, and the second resolution of the viewing window is a resolution lower than the first resolution of the selected frame image, wherein the at least one processor is further configured to identify the tracking object using a first deep learning model, and to determine whether the tracking object identified in different selected frame images corresponds to a same object by generating feature data using a second deep learning model and determining the same object based on a similarity between feature data, and wherein the at least one processor is further configured to determine positional criticality by calculating a distance between a first viewing window set for a first selected frame image and a second viewing window set for a second selected frame image, and to reset the second viewing window based on the first viewing window when the positional criticality is not satisfied, wherein the at least one processor is further configured to control the viewing window to automatically move and be size-adjusted in response to the location and scale of the tracking object, and to process the selected frame image within the viewing window in a manner corresponding to panning or zooming on the tracking object while the camera module remains fixed.

13. The computing device of claim 12, wherein the at least one processor executes the one or more instructions to provide a user display interface and display the viewing window.

14. The computing device of claim 12, wherein the camera module is fixed in a preset forward direction regardless of existence or movement of the tracking object and performs capturing at the first resolution to generate the selected frame image.

15. The computing device of claim 14, wherein the first resolution of the selected frame image is preset and fixed, and the second resolution of the viewing window is variable while providing an object tracking function.

16. The computing device of claim 14, wherein the at least one processor executes the one or more instructions to receive a plurality of time sequentially captured frame images at a preset frame rate from the camera module, and extract some frame images from among the plurality of time sequentially captured frame images and set each of the extracted frame images as the selected frame image.

17. The computing device of claim 12, wherein the at least one processor executes the one or more instructions to identify the tracking object in the selected frame image using a first deep learning model trained with a large amount of training data associated with the tracking object, and determine whether the first tracking object identified in the first selected frame image and the second tracking object identified in the second selected frame image are the same object.

18. The computing device of claim 17, wherein the at least one processor executes the one or more instructions to generate first feature data associated with an external feature of the first tracking object identified in the first selected frame image using a second deep learning model trained with a large amount of training data associated with an external feature of the tracking object, generate second feature data associated with an external feature of the second tracking object identified in the second selected frame image, and determine whether the first tracking object and the second tracking object are the same object based on a similarity between the first feature data of the first tracking object and the second feature data of the second tracking object.

19. The computing device of claim 12, wherein the at least one processor is further configured to determine the positional criticality by comparing the calculated distance between the first viewing window and the second viewing window with a distance threshold, and wherein the distance threshold is set as a change distance of the viewing window that is set in proportion to a time interval between selected frames.

* * * * *